(12) United States Patent
George (10) Patent No.: US 6,602,029 B1
(45) Date of Patent: Aug. 5, 2003

(54) CUTTING TOOL AND METHOD AND APPARATUS FOR MAKING THE SAME

(75) Inventor: Stephen M. George, North Augusta, SC (US)

(73) Assignee: Kennametal Inc., Latrobe, PA (US)

( * ) Notice: Subject to any disclaimer, the term of this patent is extended or adjusted under 35 U.S.C. 154(b) by 85 days.

(21) Appl. No.: 09/680,361

(22) Filed: Oct. 5, 2000

(51) Int. Cl.$^7$ ............................................. B23B 51/02
(52) U.S. Cl. ........................ 408/230; 407/23; 407/53; 408/227
(58) Field of Search ............................. 407/53, 54, 23, 407/26; 408/222, 227, 230; 76/108.6, 108.1, 115; 451/48

(56) References Cited

U.S. PATENT DOCUMENTS

| | | | | |
|---|---|---|---|---|
| 1,151,247 | A | | 8/1915 | Denk ........................... 750/85 |
| 1,415,879 | A | | 5/1922 | Lacy ........................... 370/404 |
| 1,466,378 | A | | 8/1923 | McLaughlin |
| 1,702,812 | A | * | 2/1929 | Cochran ........................ 407/54 |
| 1,981,445 | A | | 11/1934 | Aker .............................. 51/95 |
| 2,477,730 | A | | 8/1949 | Fouquet ......................... 51/95 |
| 2,664,681 | A | | 1/1954 | Clark et al. .................... 51/283 |
| 2,903,921 | A | | 9/1959 | Andreasson .................... 77/68 |
| 2,903,922 | A | * | 9/1959 | Ernst et al. .................. 408/230 |
| 2,972,839 | A | | 2/1961 | Erdélyi ........................ 51/124 |
| 3,212,167 | A | | 10/1965 | Connelly ...................... 29/103 |
| 3,991,454 | A | | 11/1976 | Wale ......................... 29/105 R |
| 4,300,862 | A | * | 11/1981 | Yada ........................... 407/53 |
| 4,330,229 | A | * | 5/1982 | Croydon ..................... 408/212 |
| 4,556,347 | A | * | 12/1985 | Barish ....................... 408/230 |
| 4,561,813 | A | * | 12/1985 | Schneider ................... 408/230 |
| 4,602,900 | A | | 7/1986 | Arpaio, Jr. et al. ......... 408/230 |
| 4,688,972 | A | * | 8/1987 | Kubota ....................... 408/230 |
| 4,744,705 | A | | 5/1988 | Imanaga .................... 408/230 |

(List continued on next page.)

FOREIGN PATENT DOCUMENTS

| | | |
|---|---|---|
| FR | 919163 | 2/1947 |
| SU | 948624 | 8/1982 |

OTHER PUBLICATIONS

International Search Report of related application PCT/US01/30217, mailed Apr. 5, 2002.

Article titled "A Mathematical Model of the Grinding Wheel Profile Required For A Specific Twist Drill Flute", Int. J. Mach. Tool Design Res. vol. 22, No. 4 pp 239–251,1982.

Article titled on the design from the Proceedings of the Twenty–fifth International Machine Tool Design And Research Conference, 7pp., undated.

Article titled "Getting the "Hole" Answer", from Modern Machine shop, 8pp, dated Jun. 1985.

"Computer–Aided Modelling of the Fluting Process for Twist Drill Design and Manufacture", 6 pp., Annals of the CIRP vol. 47/1/1998.

Brooke Cutting Tools, Inc. catalog UD Twist Drills, 4 pp., undated.

SGS Hi–Percarb™ High Performance Carbide Drill Catalog EDP No. 00044 entitled "Increase production rates up to 12 times over conventional carbide drills", 4 pp., ©1998 SGS Tool Company.

*Primary Examiner*—Daniel W. Howell
(74) *Attorney, Agent, or Firm*—Kevin P. Weldon (57) ABSTRACT

A cutting tool has a flute and land, which follow a helix angle, wherein the flute and land are connected to one another with a convex heel to provide a smooth contour to the tool surface and to provide improved performance. A grinding wheel for producing a cutting tool, along with a method for using such a grinding wheel, is also disclosed. Finally, a crush roll for dressing such a grinding wheel is also disclosed.

35 Claims, 10 Drawing Sheets

U.S. PATENT DOCUMENTS

| | | | |
|---|---|---|---|
| 5,046,902 A | * 9/1991 | Zubov et al. | 408/230 |
| 5,049,009 A | * 9/1991 | Beck et al. | 407/54 |
| 5,065,549 A | 11/1991 | Speiser et al. | 51/288 |
| D415,774 S | 10/1999 | Wakai | D15/139 |
| 6,089,337 A | 7/2000 | Kleine et al. | 175/394 |
| 6,113,321 A | 9/2000 | Mulroy et al. | 408/211 |
| 6,190,097 B1 | 2/2001 | Thomas | 408/230 |
| D445,436 S | * 7/2001 | George | D15/139 |
| 6,419,561 B1 | * 7/2002 | George | 451/48 |
| 6,431,962 B1 | * 8/2002 | George | 451/47 |
| 2002/0141842 A1 | * 10/2002 | Tsuzaka et al. | 408/230 |

* cited by examiner

CUTTING TOOL AND METHOD AND APPARATUS FOR MAKING THE SAME

BACKGROUND OF THE INVENTION

1. FIELD OF THE INVENTION

This invention is directed to a cutting tool and, more specifically, to a cutting tool, such as a drill, having at least one helical flute with an associated land and with a curved heel connecting the flute and land.

This invention is also directed to a method and apparatus for making a cutting tool having at least one helical flute and land. In particular, a grinding wheel may be used to produce both the flute and land portions of the cutting tool.

This invention is also directed to a crush roll used to form such a grinding wheel.

2. DESCRIPTION OF RELATED ART

A cutting tool, such as a twist drill, is generally comprised of a cylindrical shaft having at least one flute and land, which follow a helical angle to a forward cutting edge at the forward end of the shaft. The land has associated with it a margin and a clearance portion behind the margin. A side cutting edge is defined by the intersection of the flute with the margin of the land. In many drills, it is typical for the portions of the land opposite the side cutting edge to terminate in a sharp edge. However, such an edge is not functional during a cutting operation and is a result solely of the manufacturing process, which utilizes a first grinding wheel to form the flute and a second grinding wheel to form the land, including the margin, of the drill. Nevertheless, this sharp edge generally disrupts the flow of any coolant that may be introduced to the drill during the cutting operation and, furthermore, weakens the drill as a result of excess removal of material in forming such an edge and impedes chip flow during a drilling operation which, in turn, limits the depth of penetration for such a drill to approximately 4–5 times the outer diameter of the drill. Deeper depths are possible if the drill is retracted from the hole so that cutting chips may be expelled from the flutes, then reintroduced to the hole to continue drilling. This is known as pecking.

Certain drills do not have this sharp edge. Parabolic drills are generally comprised of a cylindrical shaft having a flute and land. The sharp edge at the intersection of the flute and the land away from the lip is eliminated in favor of a curved edge. Parabolic drills are typically used for low-speed, light-load applications. Parabolic drills are designed for deep penetrations and, as a result, have a relatively high helix angle and have a deep flute to promote chip excavations. The deep flute causes the outer edges of the drill to be relatively thin and this reduces the torsional strength of the drill. Furthermore, the reduction in cross-sectional area at the outer edges of the drill causes the drill to be more prone to bending and buckling. However, as a result of this design, a parabolic drill is typically capable of producing a hole within a workpiece having a depth between 10–15 times the outer diameter of the drill without the need to peck.

Soviet Patent No. 948624, titled "Method for Manufacture of Twist Drills", in FIGS. 1–3, illustrates a twist drill, wherein the intersection between a flute and land opposite the side cutting edge is a curved section. However, the small radius of the curved section provides it with a relatively shallow flute and other features most resembling the conventional drill previously discussed. Coolant flow is still constrained by the land, and material must be undesirably removed from the center of the drill to accommodate the sharp curvature at the intersection between the flute and the heel, thereby reducing the core diameter of the drill.

A twist drill design is desired which permits improved coolant and chip flow while simultaneously maximizing the drill core diameter, thereby maximizing torsional strength of the drill and providing a drill having the ability to penetrate a workpiece to a depth of greater than 4–5 times the drill outer diameter.

Additionally, in the past, production of a cutting tool having both a helical flute and a land with a margin required two separate grinding operations. In one operation, the flute would be ground with one grinding wheel, and in a separate operation, the land would be ground with a second grinding wheel.

Additionally, these two separate grinding operations require mounting the cutting tool on two separate grinding machines. Therefore, the cutting tool must be precisely mounted within each grinding machine to ensure the flute and land are ground along the same helical path. Additionally, the grinding machines must be set at the same lead angle to ensure the flute and land are ground along the same helix angle. If the cutting tool is not properly mounted and the flute and land are not ground correctly, the tool may be flawed and, as a result, must be discarded. Furthermore, setup for two separate operations is not only time-consuming but also prone to error. Therefore, while the cutting tool could be ground using two grinding operations, a single grinding operation would be preferred.

A need exists to eliminate the need for two separate grinding operations through the use of a single grinding wheel and a method for using the same.

Finally, such a grinding wheel may be produced using single point dressing tools or CNC machines. However, each of these methods is time-consuming and expensive. As a result, a method and apparatus is desired for producing such a grinding wheel in a more efficient manner.

BRIEF SUMMARY OF THE INVENTION

One aspect of the subject invention is directed to a cutting tool has a shaft with a longitudinal axis, wherein the shaft has a forward end and the shaft has an external surface. The external surface, when viewed in a cross-section perpendicular to the longitudinal axis and spaced from the forward end, has a flute extending about the longitudinal axis of the shaft along the helix angle, wherein the flute has a lip extending inwardly from an outer radius and a nose adjacent to the lip. The external surface also has a land adjacent to the flute and extending about the longitudinal axis of the shaft along the helix angle. The land has a margin which is adjacent to the lip and has a radius equal to the outer radius. The land also has a clearance portion which is adjacent to the margin and has a radius less than the outer radius. A convex heel connects the nose with an adjacent clearance portion to provide a continuous surface between the web and clearance portion. The heel preferably has a radius of between 15–75% of the outer radius. The smallest width of the tool at the centerline is less than the peripheral distance along any clearance portion.

Another aspect of the subject invention is directed to a grinding wheel for producing a helical cutting tool with a shaft with a longitudinal axis. The cutting tool shaft has a forward end and is comprised of a flute having a radial depth and extending about the longitudinal axis of the shaft along a helix angle and a land adjacent to the flute. The flute has a lip extending inwardly from an outer radius and a nose adjacent to the lip. Each land has a margin adjacent to the lip and has a radius equal to the outer radius and a clearance portion adjacent to the margin, wherein the clearance portion and the nose are connected by a heel. The grinding wheel is comprised of a disk having a disk centerline and an average radial size, a first side and a second side defining a width therebetween, and a disk outer edge between the sides, wherein the edge has an abrasive material for grinding a cutting tool and wherein the edge has a profile defined by:

a) a lip shaper segment having a convex shape and extending in a lateral direction from the first side and extending away from the disk centerline a radial distance equal to the radial depth of the flute;

b) a nose shaper segment adjacent to the lip shaper segment and extending in a lateral direction toward the second side and extending inwardly toward the disk centerline;

c) a clearance shaper segment having a curved shape and extending from the nose shaper segment toward the second side and having a radius greater than eight times the tool outer radius; and    d) a margin shaper segment extending from the clearance shaper segment toward the second side and inwardly toward the disk centerline.

Yet another aspect of the subject invention is directed to a method of producing a cutting tool having a shaft with a longitudinal axis and having a flute with a lip and a nose and an adjacent land with a clearance portion and a margin. The flute and land are along a helix angle, the margin has an outer radius, and the clearance portion is recessed from the margin. The method comprises the step of:

a) producing both the flute and land of the cutting tool by grinding the shaft with a single pass of a grinding wheel, wherein the grinding wheel has a clearance shaper segment to produce a clearance portion on the cutting tool, and wherein the clearance shaper segment has a radius of greater than ten times the outer radius.

Another aspect of the subject invention is directed to a cutting tool having a shaft with a longitudinal axis having a flute with a lip and a nose, and an adjacent land with a clearance portion and a margin. The flute and land are along a helix angle, the margin has an outer radius, and the clearance portion is recessed from the margin. The cutting is produced with a method comprising the step of:

a) producing both the flute and land of the cutting tool by grinding the shaft with at least one pass of a single grinding wheel, wherein the grinding wheel has a clearance shaper segment to produce a clearance portion on the cutting tool, and wherein the clearance shaper segment has a radius of greater than ten times the outer radius.

A final aspect of the subject invention is directed to a crush roll for dressing a grinding wheel, wherein the grinding wheel is used to produce a helical cutting tool with a shaft with a longitudinal axis, wherein the cutting tool shaft has a forward end and is comprised of a flute having a radial depth and extending about the longitudinal axis of the shaft along a helix angle and a land adjacent to the flute. The flute has a lip extending inwardly from an outer radius and a nose adjacent to the lip. Each land has a margin adjacent to the lip and has a radius equal to the outer radius and a clearance portion adjacent to the margin, wherein the clearance portion and the nose are connected by a heel. The crush roll is comprised of a disk having a disk centerline and an average radial size, a first side and a second side defining a width therebetween and a disk outer edge between the sides, wherein the edge has an abrasive material for dressing the grinding wheel and wherein the edge has a profile defined by:

a) a lip former segment extending in a lateral direction from the first side and extending toward the disk centerline, a radial distance equal to the radial depth of the flute;

b) a nose former segment adjacent to the lip former segment and extending in a lateral direction toward the second side and extending outwardly from the disk centerline;

c) a clearance former segment having a curved shape and extending from the nose former segment toward the second side and having a radius greater than eight times the outer radius of the cutting tool; and    d) a margin former segment extending from the clearance former segment toward the second side and extending outwardly from the disk centerline.

DETAILED DESCRIPTION OF THE INVENTION

The Cutting Tool

Figure 1:
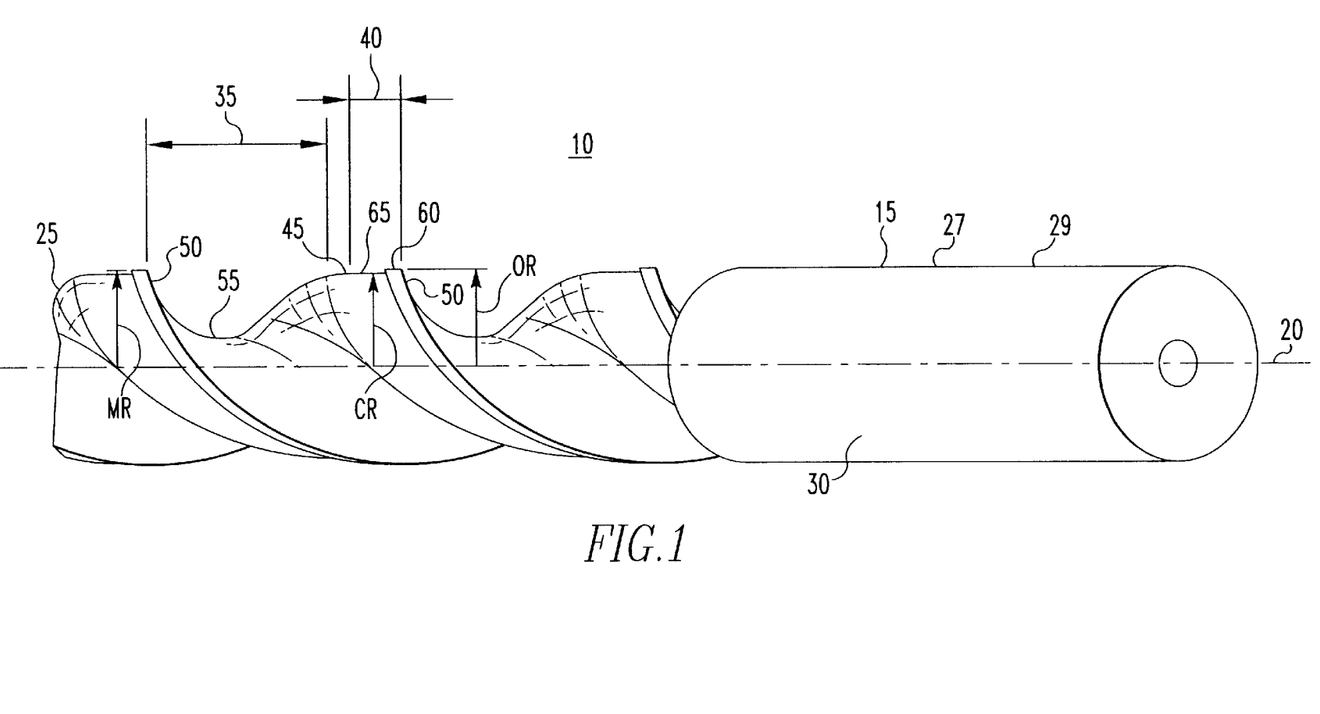
FIG. 1 is an isometric view of a drill, in accordance with the subject invention.

In one embodiment, the subject invention is directed to a cutting tool having a helical flute, which has a curved heel. For purposes of explanation, a twist drill will be discussed with the understanding that the subject invention is applicable to other cutting tools having helical flutes, such as, for example, endmills, taps, reamers, and hobs. Such cutting tools may or may not have a forward end capable of contacting and cutting a workpiece. FIG. 1 shows a cutting tool 10 which, for purposes of discussion, will be a twist drill, having a shaft 15 with a longitudinal axis 20. The shaft 15 has a forward end 25 capable of contacting and cutting a workpiece (not shown). The shaft 15 has an external surface 30, wherein the external surface, when viewed in a cross-section shown in FIG. 5, has a flute 35, a land 40, and a heel 45 therebetween.

At the rearward end 27 of the shaft 15 is a shank 29, which may be generally cylindrical, or may have a non-cylindrical shape to fit within a chuck (not shown). While the shank 29 is illustrated as cylindrical, it should be clear that the shank 29 may be square, hexagonal, conical, or any other suitable non-cylindrical shape for gripping within a chuck.

Additionally, when the shank 29 is cylindrical, it may have a radius greater to or less than the radius of the shaft 15.

Figures 2, 3, 4:
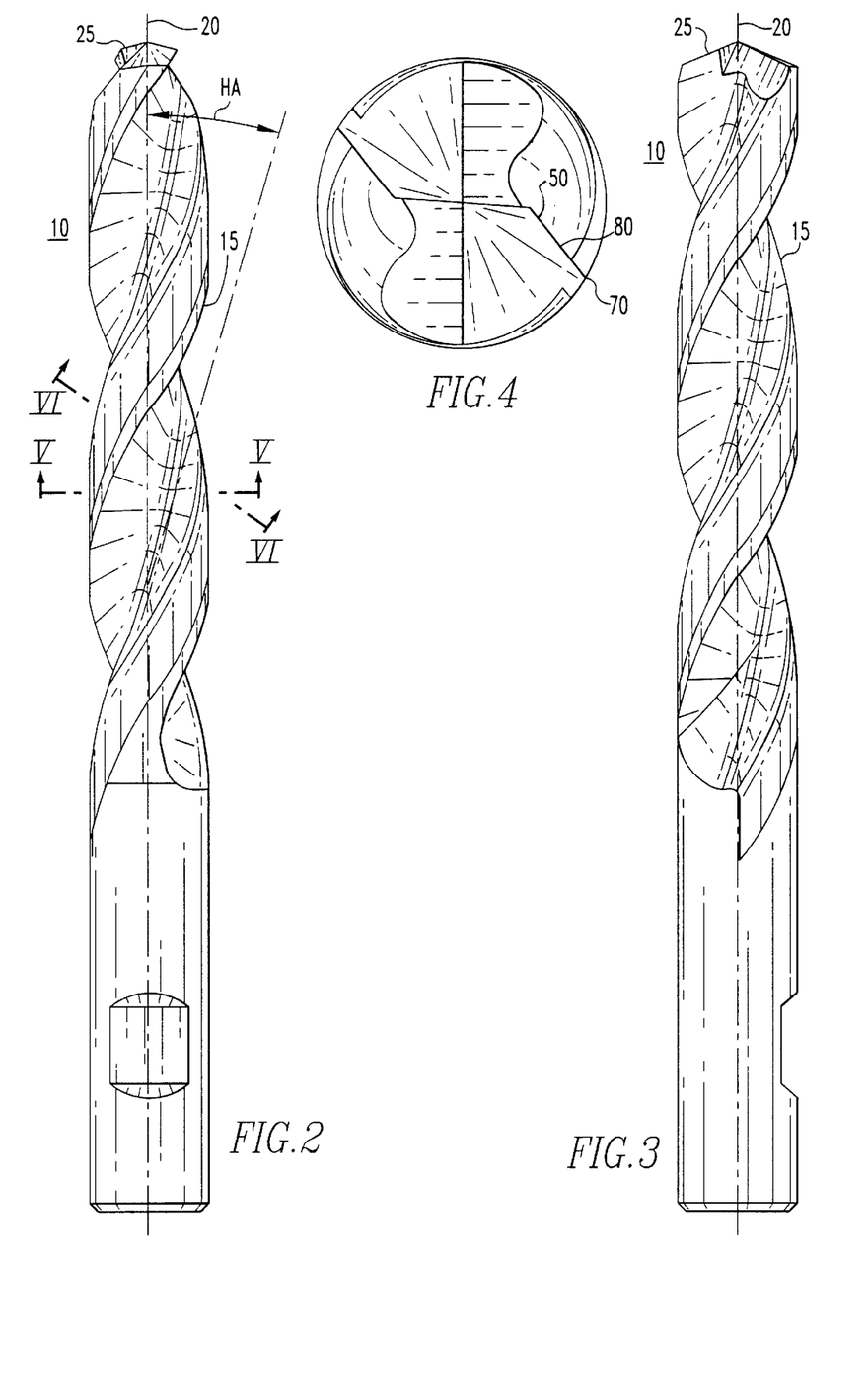
FIG. 2 is an elevation view of the twist drill, in accordance with the subject invention.
FIG. 3 is a side view of the drill illustrated in FIG. 2.
FIG. 4 is an enlarged top view of the drill illustrated in FIG. 2.

The flute 35 extends about the longitudinal axis 20 of the shaft 15 along a helix angle HA (FIG. 2). Directing attention to FIGS. 1 and 5, the flute 35 is comprised of a lip 50 extending inwardly from an outer radius OR and a nose 55 adjacent to the lip 50.

The land 40 is adjacent to the flute 35 and extends about the longitudinal axis 20 along the helix angle HA a peripheral distance LD about the cutting tool 10. The distance LD may subtend an arc of about 50°. The land 40 has a margin 60 with a radius MR equal to the outer radius OR. The land 40 also has a clearance portion 65, which is adjacent to the margin 60, and is within an envelope circumscribed by the outer radius OR. In one embodiment, illustrated in FIG. 1, the clearance portion 65 has a clearance radius CR which is less than the outer radius OR. However, it may be possible for the clearance portion 65 to have a taper with a changing radius CR over its length.

Figure 5:
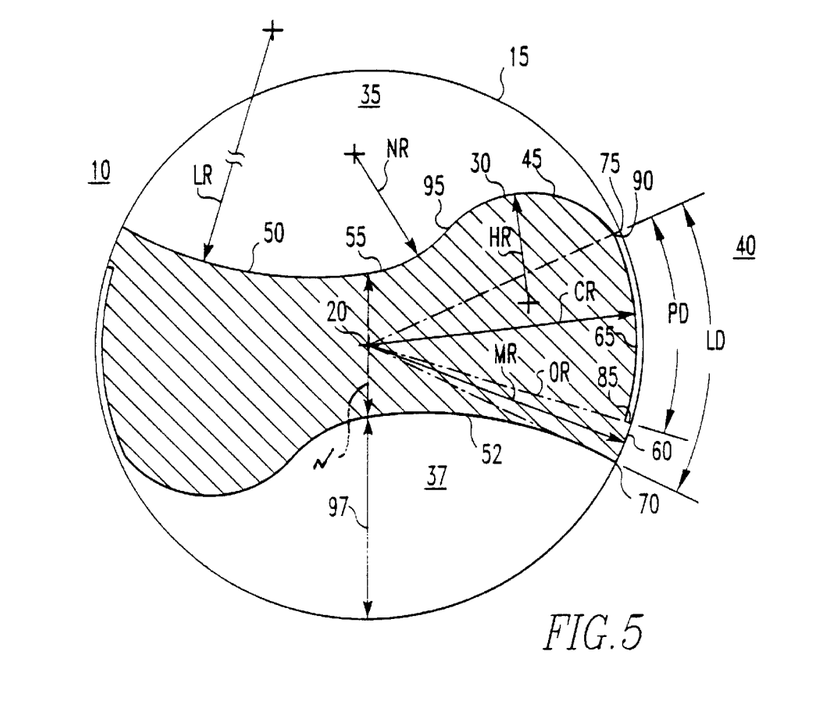
FIG. 5 is a section view along arrows V—V of FIG. 2.

The cutting tool 10, illustrated in FIGS. 1–6, has two flutes extending along its length. It should be appreciated that the subject invention may apply to drills having a single flute or multiple flutes (e.g., 2, 3, 4 or more flutes). In the instance of a single flute 35, the land 40 would extend around the cutting tool 10 from the flute 35 to the cutting edge 70. In FIG. 5, because there are two flutes, the land 40 is adjacent to the lip 52 of an adjacent flute 37 and intersects to form side cutting edge 70.

The heel 45 connects the nose 55 of the flute 35 with an adjacent clearance portion 65 to provide a continuous surface between the nose 55 and the clearance portion 65 of the land 40. The heel 45 has a heel radius HR, which is between 15–75% of the outer radius OR.

Directing attention to FIG. 5, the land 40 is defined by the distance LD about the periphery of the cutting tool 10 from the cutting edge 70 to the edge 75 of the clearance portion 65. The land 40 distance LD subtends an arc between 40–80° about the longitudinal axis 20. The smallest web thickness W of the cutting tool 10 at the longitudinal axis 20 is less than the peripheral distance PD of the clearance portion 65.

The clearance peripheral distance PD along the clearance portion 65 begins at the clearance portion edge 75 and subtends an arc of about 40° to the cutting edge 70.

In a preferred embodiment, the heel radius HR is at least 25% of the outer radius OR. Additionally, the smallest web thickness W of the shaft 15 may be between 30–80% of the peripheral distance PD along the clearance portion 65.

The smallest web thickness W of the shaft 15 may also be between 25–70% of the outer radius OR and, in a preferred embodiment, may be approximately 50% of the outer radius OR.

In a preferred embodiment, the smallest web thickness W of the shaft 15 is approximately 36% of the peripheral distance PD along the clearance portion 65.

The nose 55 has a nose radius NR, which may be constant. Additionally, the heel radius HR may also be constant. Therefore, not only is it possible for the web and the heel 45 to each have a constant radius, but the constant radius of each of the nose 55 and the heel 45 may be equal such that NR=HR. However, the ratio of the web radius NR to the heel radius HR is preferably between 0.7 and 1.3.

The lip 50, illustrated in FIG. 5, is concave and has a radius LR. However, when viewed from the forward end 25 in FIG. 4, a projection 80 of the lip 50 is a straight line. In certain circumstances, the contour of this projection 80 may be curved, thereby providing a positive rake angle to the cutting edge 70 of the cutting tool 10.

Returning to FIG. 5, the clearance portion 65 may be concentric with a clearance radius CR about the longitudinal axis 20, thereby providing structural support behind the cutting edge 70 at the margin 60. This feature is in contrast to a parabolic drill, which may have a clearance radius that decreases with peripheral distance away from the cutting edge 70.

At the transition between the margin 60 and the clearance portion 65, a transition segment 85 may be linear and is generally radial to the longitudinal axis 20. The transition segment 85 may also be ramped between the margin 60 and the clearance portion 65 (FIG. 5A) and may be curved or straight.

Figure 5A:
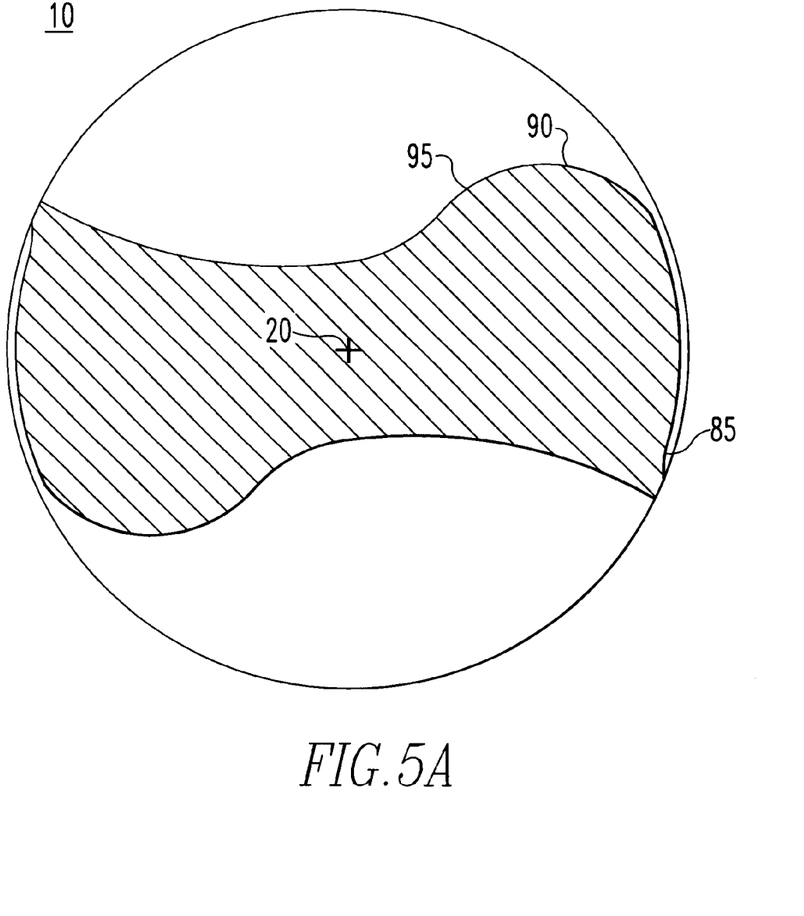
FIG. 5A is a section view along arrows V—V of FIG. 2 modified to show an alternate embodiment of the drill.

The point of intersection 90 between the clearance portion 65 and the heel 45 may have a tangency that is equal on both the clearance portion 65 and the heel 45. This provides a continuous blend between the clearance portion 65 and the heel 45. Furthermore, the point of intersection 95 between the heel 45 and the nose 55 may also have an equal tangency (FIG. 5A). To provide a continuous surface between the flute 35 and the land 40, the tangent at the point of intersection 90 between the clearance portion 65 and heel 45 may be equal, and the tangency at the point of intersection 95 between the heel 45 and the nose 55 may also be equal. As a result, the contour of the exterior surface 30 between the clearance portion 65, the heel 45, and the nose 55 may be continuous. clearance portion 65 and heel 45 may be equal, and the tangency at the point of intersection 95 between the heel 45 and the nose 55 may also be equal. As a result, the contour of the exterior surface 30 between the clearance portion 65, the heel 45, and the nose 55 may be continuous.

FIGS. 1–5 illustrate a twist drill 10 having two flutes. As mentioned, it should be appreciated that the spirit of the invention is not limited to two flutes, and arrangements having a single flute or multiple flutes are also well within the spirit of the subject invention. In the event that additional flutes are included, then the subject twist drill will include additional flute/land pairs, wherein each pair extends along the longitudinal axis 20 of the shaft 15 along the helix angle HA to form a plurality of flute/land pairs adjacent to one another along the shaft 15.

Figure 6:
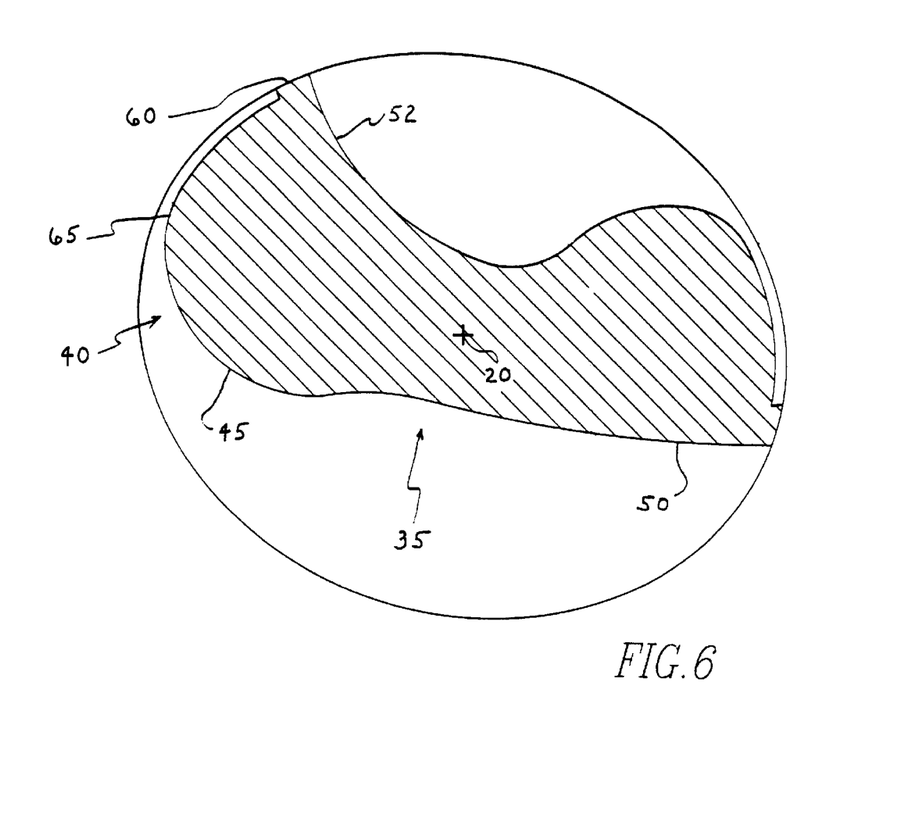
FIG. 6 is a section view along arrows VI—VI, illustrated in FIG. 2.

FIG. 6 illustrates a section view along arrows VI—VI in FIG. 2. Of particular interest is the asymmetrical shape of this cross-section, which is the result of taking an angled profile of this drill. The only location where a cross section would provide a symmetrical arrangement is a cross-section similar to that along arrows V—V perpendicular to the longitudinal axis 20.

In one embodiment of the drill, for a 0.50 inch diameter drill, the following dimensions may be used:

| | |
|---|---|
| helix angle (HA) = | 30° |
| outer radius (OR) = | 0.250 inch |
| heel radius (HR) = | 0.092 inch |
| nose radius (NR) = | 0.098 inch |

-continued

| | |
|---|---|
| clearance radius (CR) = | 0.241 inch |
| margin radius (MR) = | 0.250 inch |
| lip radius (LR) = | 0.420 inch |
| web thickness (W) = | 0.134 inch |

A Grinding Wheel for Producing the Cutting Tool

In the past, cutting tools having helical flutes and associated lands were commonly generated utilizing two separate grinding wheels and involved two separate grinding steps. As mentioned, not only were these two steps time-consuming, but proper alignment of the cutting tool after the first grinding operation was critical, such that the helical flutes and the associated land would be parallel to one another. Absent this relationship, the cutting tool would be considered defective and, therefore, discarded.

The inventor has produced a single grinding wheel capable of simultaneously generating both the helical flute and associated land on a cutting tool. This design not only permits cutting tools to be manufactured faster but, furthermore, improves the degree of accuracy with which the cutting tools are formed and eliminates scrap caused when the flute and the land are not parallel to one another.

Figure 7:
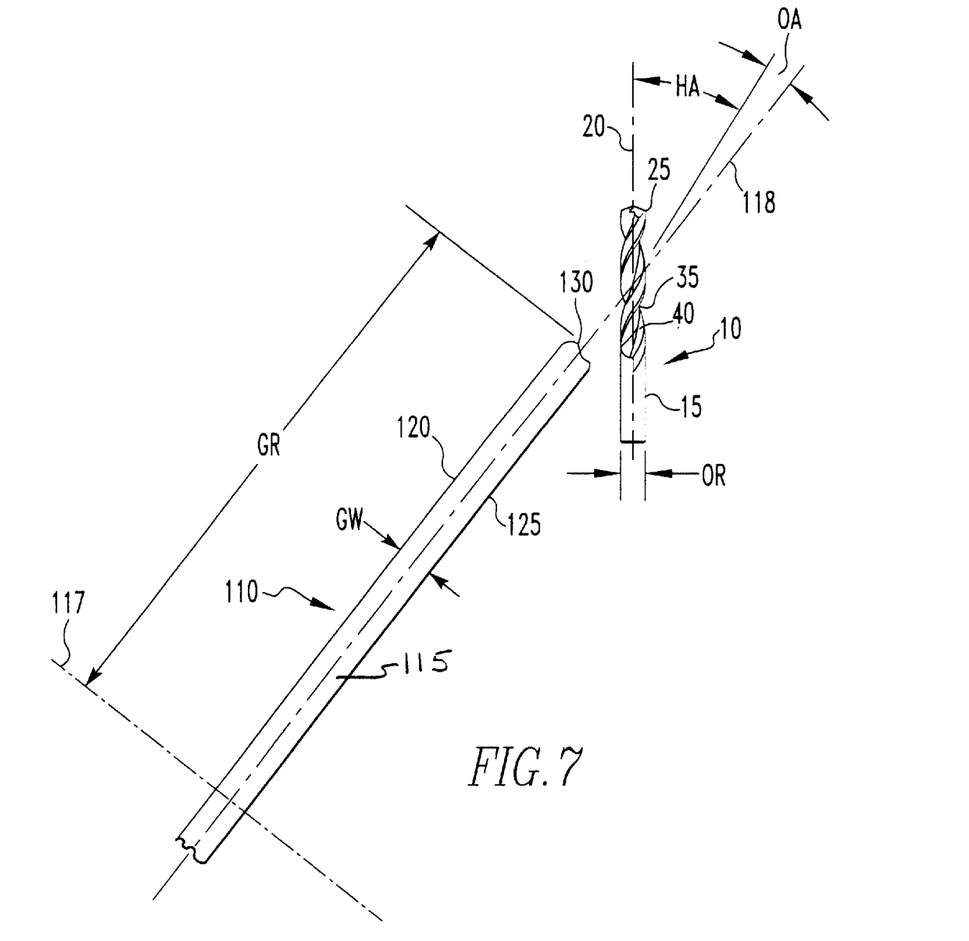
FIG. 7 is a sketch illustrating a view along the offset angle of a grinding wheel positioned adjacent to, but spaced from, a finished cutting tool.

FIG. 7 illustrates a grinding wheel 110 for producing a helical cutting tool 10 having a shaft 15 with a longitudinal axis 20. The shank 29, which may or may not be cylindrical, is not shown. The cutting tool shaft 15 has a forward end 25 and is comprised of a flute 35 having a radial depth 97 (FIG. 5). The flute 35 extends about the longitudinal axis 20 of the shaft 15 along a helix angle HA. A land 40 is adjacent to the flute 35, wherein the flute 35 has a lip 50 extending inwardly from an outer radius OR and a nose 55 adjacent to the lip 50 (FIG. 1). Each land 40 has a margin 60 adjacent to the lip 50 and has a radius MR equal to the outer radius OR. A clearance portion 65 is adjacent to the margin 60, and the clearance portion 65 and the nose 55 are connected to one another by a heel 45.

Directing attention again to FIG. 7, the grinding wheel 110 is comprised of a disk 115 having a disk centerline 117, a maximum radius GR extending to the outermost radial point 157, a longitudinal axis 118 and an average radial size. The disk 115 has a first side 120 and an opposing second side 125 defining a width GW therebetween. A disk outer edge 130 extends between the sides 120, 125. The sides 120, 125 and the outer edge 130 have an abrasive material thereupon for grinding a cutting tool 10. Such an abrasive material may be any of a number of typical materials used to grind metal including, but not limited to, silicon carbide (for example, cubic boron nitride, aluminum oxide or diamond). A typical grinding wheel 110 may be fabricated of a resin-bonded material such as silicon carbide. Resin bonds are suitable for applications involving shock and deflection, therefore, the structure is weak enough for them to work effectively on surface grinders with low speed and horsepower capabilities. Alternatively, metal bond grinding wheels may also be used.

Figure 8:
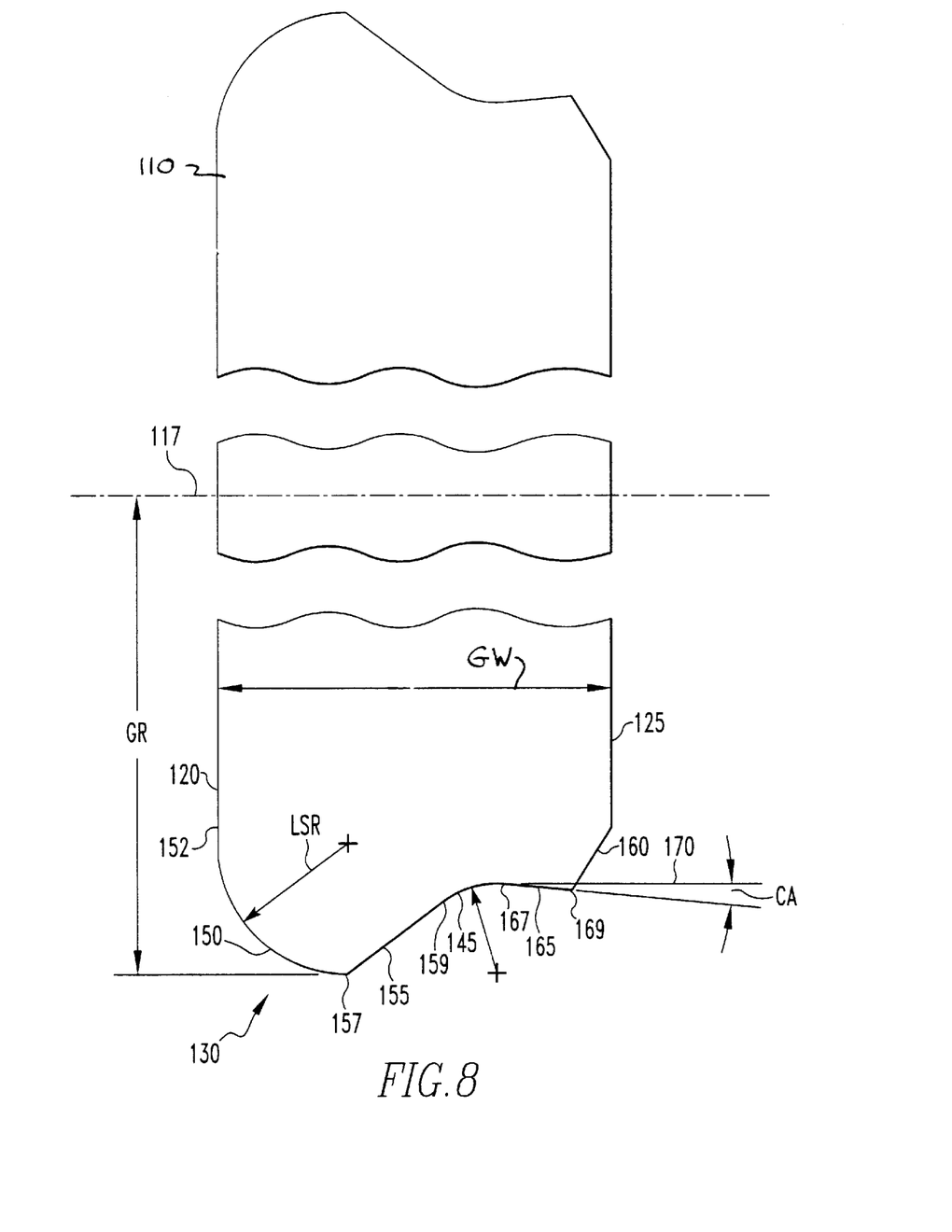
FIG. 8 illustrates details of the grinding wheel used to produce the cutting tool.

FIG. 8 illustrates a side view of a typical grinding wheel 110, in accordance with the subject invention, in a manner in which features of the grinding wheel 110 may be discussed.

Certain portions of the edge 130 of the grinding wheel 110 are used to generate certain portions of the flute 35 and land 40 of the cutting tool 10 and, for that reason, the numbering for these particular items will be incremented by 100 from the associated part on the cutting tool 10.

The outer edge 130 is comprised of a lip shaper segment 150 having a convex shape and extending in a lateral direction from the first side 120 and further extending away from the disk centerline 117 a radial distance GR equal to the radial depth 97 of the flute 35 (FIG. 5).

A nose shaper segment 155 is adjacent to the lip shaper segment 150 and extends in a lateral direction toward the second side 125 and, furthermore, extends inwardly toward the disk centerline 117.

A clearance shaper segment 165 has a curved shape and extends from the nose shaper segment 155 toward the second side 125. The clearance shaper segment 165 may have a radius greater than eight times the tool outer radius OR.

A margin shaper segment 160 extends from the clearance shaper segment 165 toward the second side 125 and, furthermore, extends inwardly toward the disk centerline 117.

In one embodiment, the slope of the lip shaper segment 150 and the slope of the nose shaper segment 155, at their point of intersection 157, may not be equal.

It is also possible for a portion 152 of the lip shaper segment 150 closest to the first side 120 to be parallel to the first side 120.

It was previously mentioned that the clearance shaper segment 165 had a radius greater than eight times the tool outer radius OR. The clearance shaper segment 165 may have a radius of between eight to fifty times the outer radius OR. Furthermore, the clearance shaper segment 165 may have a radius which is infinite, thereby causing the segment 165 to be straight.

The clearance shaper segment 165 is bounded by two end points 167 and 169. A line connecting these two end points 167, 169 of the clearance shaper segment 165 defines a clearance angle CA of preferably between 0–150° with a line 170 parallel to the centerline 117 of the disk 115. In one embodiment, for a wheel having a radius GR of 18 inches, a typical clearance angle CA would be 10°.

Directing attention to the nose shaper segment 155, the segment 155 may have a concave shape with a radius of between eight to fifty times the outer radius OR. It is further possible for the nose shaper segment 155 to have essentially an infinite radius, thereby causing the segment 155 to be straight.

Directing attention to the margin shaper segment 160, the segment 160 is curved and has a radius equal to between eight to fifty times of the outer radius OR. The curve may be convex, concave or straight, depending upon the desired transition between the clearance portion and the margin of the cutting tool. Just as before, the radius of the margin shaper segment 160 may be infinite, thereby providing a linear segment as shown in FIG. 8.

It is entirely possible to include a heel shaper segment 145 extending to the clearance shaper segment 165 in a lateral direction from the nose shaper segment 155 toward the second side 125. The heel shaper segment 145 may have a concave shape and is bounded by points 159 and 167. A slope at the intersection between the nose shaper segment 155 and the heel shaper segment 145 may be equal. Additionally, the slope at the intersection between the heel shaper segment 145 and the clearance shaper segment 165 may be equal.

Figure 11:
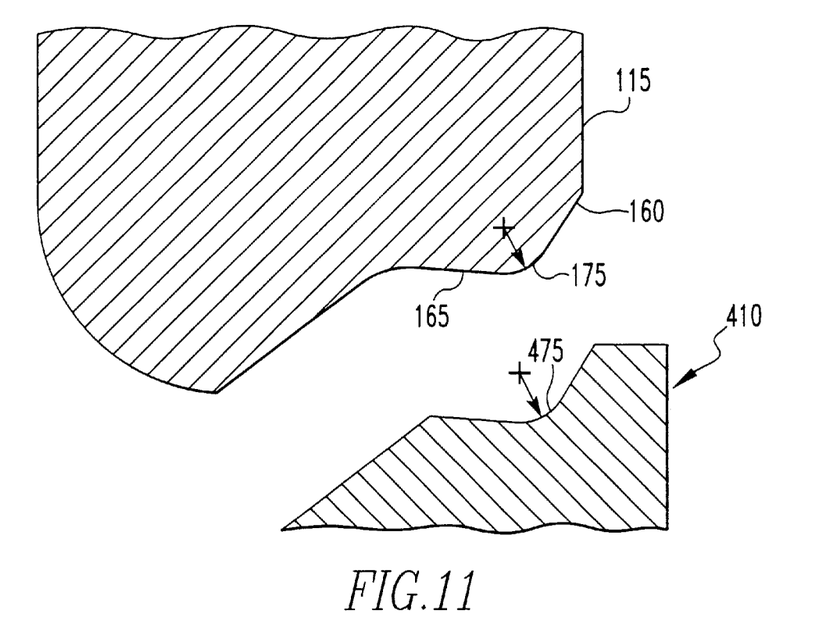
FIG. 11 illustrates an alternate embodiment of the grinding wheel.

In yet another embodiment, as illustrated in FIG. 11, the edge 130 may further include a fillet shaper segment 175 having a convex shape extending between the clearance shaper segment 165 and the margin shaper segment 160.

In one embodiment of the subject invention, the grinding wheel 110 may have a radius of 9 inches and a width of 0.71 inch. The lip shaper segment 150 extends from the first side 120 and has a convex shape with a radius of 0.24 inch, wherein the beginning portion of the lip shaper segment 150 is tangent to the first side 120. The lip shaper segment 150 extends until it is tangent to the disk longitudinal axis 117. The nose shaper segment 155 is linear and extends from the lip shaper segment 150 toward the longitudinal axis 117 at an angle of approximately 36° with the axis 117. Adjacent to the nose shaper segment 155, the heel shaper segment 145 is concave and has a radius of 0.188 inch and extends to a point closest to the axis 118 and then away from the axis 118 to a tangent point 167 with the adjacent clearance shaper 165, which is linear and forms an angle of 4° with a line parallel to the axis 117. At a location 0.662 inch from the first side 120, the margin shaper segment 160, which is linear, extends at an angle of 4° with a line parallel to the axis 117 to intersect with the second side 125 of the disk 115. Both the first side 120 and second side 125 of the disk 115 are straight and parallel to one another.

Figure 9:
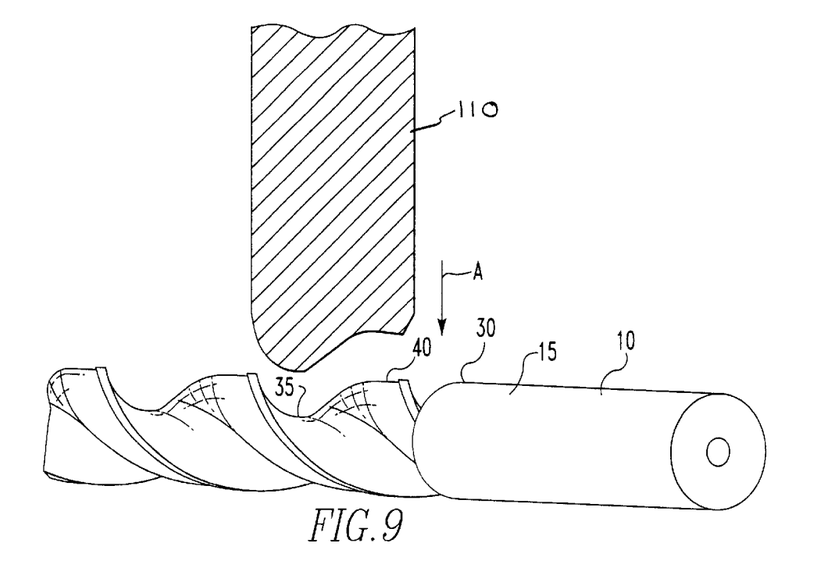
FIG. 9 illustrates the grinding wheel and cutting tool of FIG. 7 spaced from one another to highlight their features.

FIG. 1 illustrates a perspective view of a cutting tool 10, in accordance with the subject invention. FIG. 9 illustrates a view of the same cutting tool 10 with the grinding wheel 110 which may be utilized to produce the flute 35 and land 40 of that cutting tool 10. For purposes of illustration, the grinding wheel 110 is spaced from the cutting tool 10; however, aligned properly such that lateral displacement of the grinding wheel 110 will properly position the grinding wheel 110 relative to the cutting tool 10. In actual operation, the grinding wheel 110 is advanced into the external surface of the cutting tool 10 in the direction A illustrated in FIG. 9. However, it should be appreciated that, prior to such advancement, the flute 35 and land 40 are not yet formed in the body of the cutting tool 10 and resemble the portion of the shaft 15, illustrated to the right in FIG. 9.

Figure 10:
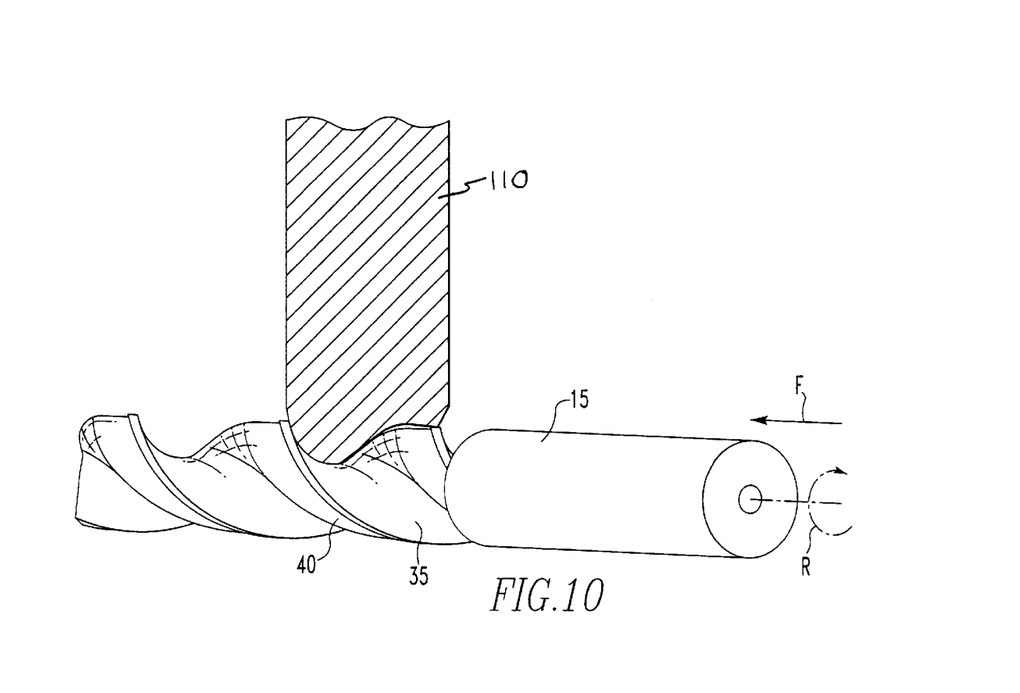
FIG. 10 illustrates a view along the offset angle of the grinding wheel and cutting tool of FIG. 7 contacting one another.

FIG. 10 illustrates the grinding wheel 110 positioned to fully grind the flute 35 and the land 40. During such an operation, the shaft 15 is rotated, as illustrated by arrow R, and is simultaneously translated in the direction indicated by arrow F, while the grinding wheel 110 rotates, thereby permitting the grinding wheel 110 to impart a helical flute 35 and associated land 40 to the shaft 15.

Method of Producing Cutting Tool

Unlike previous techniques which required the utilization of two separate grinding wheels to create a helical flute and associated land, in one embodiment of the subject invention, a single grinding wheel 110 may be utilized to produce, simultaneously, both the flute 35 and land 40.

In particular, a further embodiment of the subject invention addresses such a method. With reference again to FIG. 1 and FIGS. 8–10, a method is disclosed for producing a cutting tool 10 as previously described. The method comprises the steps of producing a flute 35 and land 40 of the cutting tool 10 by grinding the shaft 15 with at least one pass of a grinding wheel 110. When using a grinding machine with lower horsepower, more than one pass of the grinding wheel 110 may be necessary with each pass penetrating the shaft 115 (workpiece) to a greater depth.

The method may further comprise the step of producing, in at least one pass with the same grinding wheel 110, a convex heel 45 connecting the nose 55 of the flute 35 with a clearance portion 65 of the land 40 to provide a continuous surface between the nose 55 and the clearance portion 65.

In operation, a grinding wheel 110 having a radius of 9 inches may be used to grind a cutting tool 10 having an outer radius of 0.25 inch. Under these circumstances, the grinding wheel 110 may be rotated at a speed of between 1500–4000 RPM. At a speed of 2000 RPM, the cutting tool 10 may be axially fed (infeed) to the wheel at a rate of between 4–6 inches per minute. The helix angle HA typically is fixed for different grinding machines based upon the infeed rate and is a function of the rotational speed of the cutting tool 10, as it is fed to the wheel. However, different grinding machines may be adjusted to adjust the helix angle HA. Depending upon the power of the grinding machine, the grinding operation may be accomplished by a single pass of the grinding wheel at full depth or multiple passes with progressively greater depths.

As will be further discussed, a crush roll 410 having a mirror image of the outer edge 130 of the grinding wheel 110 may be urged against the grinding wheel 110, thereby imparting the shape of the crush roll 410 to the grinding wheel 110. This is especially beneficial in instances where the grinding wheel 110 is a resin-bonded grinding wheel which is flexible and, therefore, preferably must be frequently redressed.

Returning to FIG. 7, the flute 35 and land 40 extend around the longitudinal axis 20 of the cutting tool 10 to define a helix angle HA which may preferably have a value between 22° and 38°. As further illustrated in FIG. 7, the radius GR of the grinding wheel 110 is significantly larger than the outer radius OR of the cutting tool 10, such that the grinding wheel 110 contacts the cutting tool 10 at a point where the grinding wheel 110 is tangent to the cutting tool 10 but, furthermore, at locations in front of and behind this tangency point. As a result, to better control the grinding process, the grinding wheel 110 is offset relative to a longitudinal axis 118 extending through the grinding wheel 110. The grinding wheel 110 may be offset at an offset angle OA relative to the helix angle HA by an amount between 30°–40°.

In another embodiment of the subject method, the flute 35 and land 40 of the cutting tool 10 may be produced by grinding the shaft 15 with at least one pass of the grinding wheel 110. This produces a convex heel 45 connecting the nose 55 of the flute 35 with a clearance portion 65 of the land 40 to provide a continuous surface between the nose 55 and the clearance portion 65, wherein the heel 45 has a radius of between 15–75% of the outer radius OR.

Cutting Tool Product by Process

What has been described so far is a fluted cutting tool 10, the grinding wheel 110 for producing such a fluted cutting tool 10, and a method for producing such a cutting tool 10.

The general concept of producing a helical fluted cutting tool 10 utilizing a single grinding wheel 110 is believed to be unique and, therefore, the product such as the cutting tool 10 discussed herein is also believed to be unique as a result of this process.

Crush Roll Apparatus

The perfect grinding wheel 110, operating under ideal conditions, will be self-sharpening, such that as the abrasive grains become dull, they tend to fracture and be dislodged from the wheel by the grinding forces, thereby exposing new sharp abrasive grains. Although in precision machine grinding this ideal sometimes may be partially attained, it is almost never attained completely. Usually, the grinding wheel 110 must be dressed and trued after mounting on the precision grinding machine spindle and periodically thereafter. One device for providing this feature is a crush roll 410, which may be a hardened steel or carbide roll and which also may be impregnated with diamonds, which is free to rotate and has the desired form of the grinding wheel 110. The crush roll 410 is fed gradually into the grinding wheel 110, which runs at a slow speed. The crush roll 410 will, by crushing action, produce its reverse form in the wheel. The crush roll 410 produces a free-cutting wheel face with sharp grains. The preferred method of dressing the grinding wheel 110 in accordance with the subject invention involves the use of a crush roll 410, illustrated in FIGS. 12 and 13.

As will be seen, the profile of the crush roll 410 is a mirror image of the outer edge 130 of the grinding wheel 110.

Directing attention again to FIGS. 12 and 13, and to FIG. 1 for cutting tool details, a crush roll 410 for dressing a grinding wheel 110 is disclosed, wherein the grinding wheel 110 is used to produce a helical cutting tool 10 previously described. The crush roll 410 is comprised of a disk 415 having a disk centerline 417 and an average radial size CR. The disk 415 has a first side 420 and a second side 425 defining a width CW therebetween, and a disk outer edge 430 between the sides 420, 425. The edge 430 has an abrasive material for dressing a grinding wheel 110 and wherein the outer edge 430 has a profile.

Figure 12:
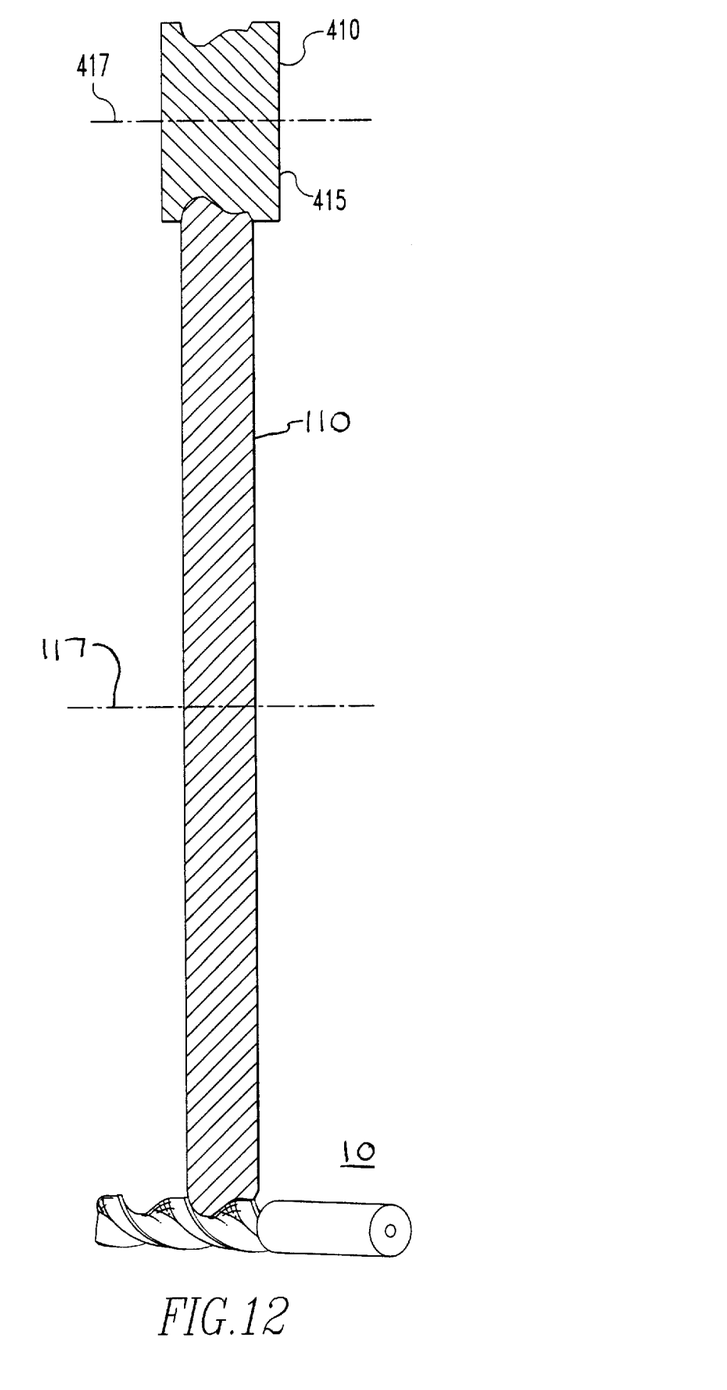
FIG. 12 is a sketch illustrating a crush roll acting upon the grinding wheel to shape the wheel.
Figure 13:
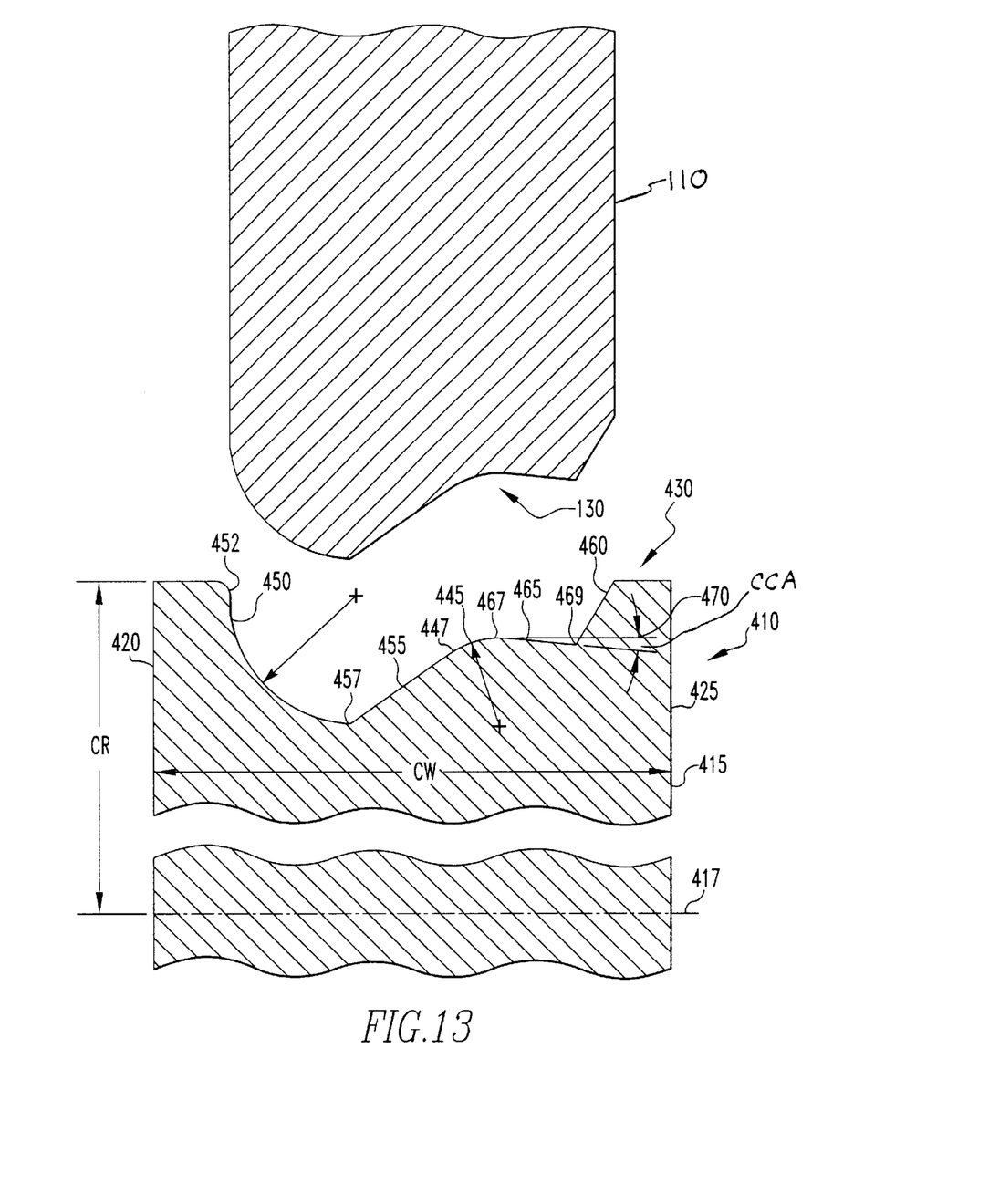
FIG. 13 illustrates the grinding wheel and crush roll of FIG. 12 spaced from one another to highlight their features.

The profile is defined by a lip former segment 450 having a concave shape and extending in a lateral direction from the first side 420 and extending toward the disk centerline 417 a radial distance equal to the radial depth 97 of the flute 35. The profile further comprises a nose former segment 455 adjacent to the lip former segment 450 and extending in a lateral direction toward the second side 425 and further extending outwardly from the disk centerline 417. A clearance former segment 465 extends from the nose former segment 455 toward the second side 425, and has a radius greater than ten times the outer radius OR of the cutting tool 10. A margin former segment 460 extends from the clearance former segment 465 toward the second side 425 and extends outwardly from the disk centerline 417.

As illustrated in FIG. 13, the profile of the outer edge 430 of the crush roll 410 is a mirror image of the outer edge 130 of the grinding wheel 110.

The slope of the lip former segment 450 and the slope of the nose former segment 455, at their point of intersection 457, may not be equal.

Additionally, a portion 452 of the lip former segment 450 closest to the first side 420 is parallel to the first side 420.

Directing attention to the clearance former segment 465, this segment 465 may have a radius of between eight to fifty times the outer radius OR of the cutting tool 10. In the alternative, the clearance former segment 465 may have an infinite radius, thereby defining a straight segment. A line connecting end point 467 with end point 469 on the clearance former segment 465 defines a crush roll clearance angle CCA of between 0°–15° with a line 470 parallel to the centerline 417 of the disk 415.

For a crush roll 410 having an average radial size CR of four inches, a preferred clearance angle CCA is 10°.

Directing attention to the nose former segment 455, this segment 455 may have a concave shape with a radius of between eight to fifty times the outer radius OR of the cutting tool 10. Additionally, and in a similar fashion as the clearance former segment 465, the nose former segment 455 may also have an infinite radius such that the segment is straight.

Directing attention to the margin former segment 460, this segment 460 may be concave and may have a radius equal to between eight to fifty times of the outer radius OR of the cutting tool 10. Just as before, the radius may be infinite, thereby defining a straight segment.

The crush roll 410 may further include a heel former segment 445 having a convex shape extending in a lateral direction from the nose former segment 455 toward the second side 425 to the clearance former segment 465.

The heel former segment 445 may have a radius equal to between 50 to 100% of the outer radius OR of the cutting tool 10. The slope at the intersection point 447, between the nose former segment 455 and the heel former segment 445, may be equal. Additionally, the slope at the intersection point 467, between the heel former segment 445 and the clearance former segment 465, may be equal.

Briefly returning to FIG. 11, just as the grinding wheel 110 may include a fillet shaper segment 175, so, too, may the crush roll 410 include a fillet former segment 475 illustrated in FIG. 11 having a concave shape and extending between the clearance former segment 465 and the margin former segment 460.

What has been described is a cutting tool 10 having flutes 35 along a helical axis, whereby the nose portion 55 of the flute 35 and clearance portion 65 of the land 40 are connected by a concave heel 45.

Additionally, a single grinding wheel 110 for producing such a cutting tool 10 in at least one pass was disclosed, and a method for using such a grinding wheel 110 was disclosed. Finally, a crush roll 410 used to dress the grinding wheel 110 was disclosed.

The invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

What is claimed is:

1. A cutting tool having a shaft with a longitudinal axis, wherein the shaft has a forward end and has an external surface, wherein the external surface, when viewed in a cross-section perpendicular to the longitudinal axis and spaced from the forward end, is comprised of:

a) a flute extending about the longitudinal axis of the shaft along a helix angle, wherein the flute is comprised of a lip extending inwardly from an outer radius and a nose adjacent to the lip and wherein the projection of the lip from the forward end of the shaft is a straight line;

b) a land adjacent to the flute and extending about the longitudinal axis of the shaft along the helix angle, wherein the land has a margin which is adjacent to the lip and has a radius equal to the outer radius, and wherein the land also has a clearance portion which is adjacent to the margin and is within an envelope circumscribed by the outer radius;

c) a convex heel connecting the nose with an adjacent clearance portion to provide a continuous surface between the nose and clearance portion, wherein the heel has a radius of between 15–75% of the outer radius; and d) wherein the smallest width of the tool about the longitudinal axis is the web thickness and is less than the peripheral distance along any clearance portion.

2. The cutting tool according to claim 1, wherein the heel has a radius of at least 25% of the outer radius.

3. The cutting tool according to claim 1, wherein the web thickness is between 40–80% of the peripheral distance along any clearance portion.

4. The cutting tool according to claim 1, wherein the web thickness is approximately 36% of the peripheral distance along any clearance portion.

5. The cutting tool according to claim 1, wherein the web thickness is between 25–70% of the outer radius.

6. The cutting tool according to claim 5, wherein the web thickness is approximately 50% of the outer radius.

7. The cutting tool according to claim 1, wherein the nose has constant radius.

8. The cutting tool according to claim 1, wherein the convex heel has constant radius.

9. The cutting tool according to claim 1, wherein the nose and heel both have constant radius.

10. The cutting tool according to claim 9, wherein the ratio between the radius of the nose and the radius of the heel is between 0.7 and 1.3.

11. The cutting tool according to claim 1, wherein the lip is concave.

12. The cutting tool according to claim 1, wherein the land extends along an arc extending from the longitudinal axis of between 40°–80°.

13. The cutting tool according to claim 1, wherein the clearance portion is concentric about the longitudinal axis.

14. The cutting tool according to claim 1, wherein on the side facing the clearance portion, the margin has a transition segment to merge with the clearance portion.

15. The cutting tool according to claim 14, wherein the transition segment is linear.

16. The cutting tool according to claim 15, wherein the transition segment is curved.

17. The cutting tool according to claim 1, wherein the tangent at the point of intersection between each clearance portion and each heel is equal.

18. The cutting tool according to claim 1, wherein the tangent at the point of intersection between each heel and each nose is equal.

19. The cutting tool according to claim 1, wherein the tangent at the point of intersection between each clearance portion and each heel and at the point of intersection between each heel and nose is equal.

20. The cutting tool according to claim 1, further including at least one additional flute and an associated land, wherein each flute/land pair extends about the longitudinal axis of the shaft along the helix angle to form a plurality of flute/land pairs adjacent to one another along the shaft.

21. The cutting tool according to claim 1, wherein the forward end of the shaft is adapted to contact and to cut a workpiece.

22. The cutting tool according to claim 21, wherein the cutting tool comprises one of a drill, tap, or reamer.

23. The cutting tool according to claim 21, wherein the cutting tool comprises one of an endmill or a hob.

24. The cutting tool according to claim 21, wherein the shaft comprises a twist drill.

25. A cutting tool having a shaft with a longitudinal axis, wherein the shaft has a forward end and has an external surface, wherein the external surface, when viewed in a cross-section perpendicular to the longitudinal axis and spaced from the forward end, is comprised of:
  a) a flute extending about the longitudinal axis of the shaft along a helix angle, wherein the flute is comprised of a lip extending inwardly from an outer radius and a nose adjacent to the lip;
  b) a land adjacent to the flute and extending about the longitudinal axis of the shaft along the helix angle, wherein the land has a margin which is adjacent to the lip and has a radius equal to the outer radius, and wherein the land also has a clearance portion which is adjacent to the margin and is within an envelope circumscribed by the outer radius;
  c) a convex heel connecting the nose with an adjacent clearance portion to provide a continuous surface between the nose and clearance portion, wherein the heel has a radius of between 15–75% of the outer radius;
  d) wherein the smallest width of the tool about the longitudinal axis is the web thickness and is less than the peripheral distance along any clearance portion; and
  e) wherein the clearance portion has a taper with a changing radius over its length.

26. The cutting tool according to claim 1, wherein the clearance portion has a radius less than the outer radius.

27. The cutting tool according to claim 1, wherein the clearance portion has a taper with a changing radius over its length.

28. A cutting tool having a shaft with a longitudinal axis, wherein the shaft has a forward end and the shaft has an external surface, wherein the external surface, when viewed in a cross-section perpendicular to the longitudinal axis and spaced from the forward end, is comprised of:
  a) a flute extending about the longitudinal axis of the shaft along a helix angle, wherein the flute is comprised of a lip extending inwardly from an outer radius and a nose adjacent to the lip;
  b) a land adjacent to the flute and extending about the longitudinal axis of the shaft along the helix angle, wherein the land has a margin which is adjacent to the lip and has a radius equal to the outer radius, and wherein the land also has a clearance portion which is adjacent to the margin and is within an envelope circumscribed by the outer radius;
  c) a convex heel connecting the nose with an adjacent clearance portion to provide a continuous surface between the nose and clearance portion, wherein the heel has a radius of between 15–75% of the outer radius;
  d) wherein the smallest width of the tool about the longitudinal axis is the web thickness and is less than the peripheral distance along any clearance portion; and
  e) wherein the projection of the lip from the forward end of the shaft is a straight line.

29. A cutting tool having a shaft with a longitudinal axis and a forward end and having 1) a flute with a lip extending inwardly from an outer radius and a nose adjacent to the lip, 2) an adjacent land with a clearance portion and a margin, wherein the flute and land are along a helix angle, wherein the margin has an outer radius, wherein the clearance portion is recessed from the margin, and wherein a projection of the flute from the forward end of the shaft is a straight line, and 3) a convex heel connecting the nose with an adjacent clearance portion to provide a continuous surface between the nose and clearance portion, wherein the heel has a radius of between 15–75% of the outer radius, wherein the smallest width of the tool about the longitudinal axis is the web thickness and is less than the peripheral distance along any clearance portion, and wherein the cutting tool is produced with a method comprising the step of:
  a) producing both the flute and land of the cutting tool by grinding the shaft with at least one pass of a grinding wheel, wherein the grinding wheel has a clearance shaper segment to produce a clearance portion on the cutting tool and wherein the clearance shaper segment has a radius of greater than ten times the outer radius.

30. The cutting tool in accordance with the method of claim 29, wherein the method further comprises the step of:
  b) producing in the same at least one pass with the same grinding wheel a convex heel connecting the nose of the flute with a clearance portion of the land to provide a continuous surface between the nose and clearance portion, wherein the heel has a radius of between 15–75% of the outer radius.

31. A twist drill having a shaft with a longitudinal axis and a forward end and further having a flute with a lip and a nose and an adjacent land with a clearance portion and a margin, wherein the flute and land are along a helix angle and the margin has an outer radius, wherein a projection of the flute from the forward end of the shaft is a straight line, and wherein the cutting tool is produced with a method comprising the steps of:
  a) producing both the flute and land of the twist drill by grinding the shaft with at least one pass of a single grinding wheel; and
  b) producing in the same at least one pass with the same grinding wheel a convex heel connecting the nose of the flute with a clearance portion of the land to provide a continuous surface between the nose and clearance portion, wherein the heel has a radius of between 15–75% of the outer radius.

32. A cutting tool having a shaft with a longitudinal axis, wherein the shaft has a forward end and has an external surface, wherein the external surface, when viewed in a cross-section perpendicular to the longitudinal axis and spaced from the forward end, is comprised of:
  a) a flute extending about the longitudinal axis of the shaft along a helix angle, wherein the flute is comprised of a lip extending inwardly from an outer radius and a nose adjacent to the lip;
  b) a land adjacent to the flute and extending about the longitudinal axis of the shaft along the helix angle, wherein the land has a margin which is adjacent to the lip and has a radius equal to the outer radius, and wherein the land also has a clearance portion which is adjacent to the margin and is within an envelope circumscribed by the outer radius;
  c) a convex heel connecting the nose with an adjacent clearance portion to provide a continuous surface between the nose and clearance portion, wherein the heel has a radius of between 15–75% of the outer radius;
  d) wherein the smallest width of the tool about the longitudinal axis is the web thickness and is less than the peripheral distance along any clearance portion; and
  e) wherein the web thickness is approximately 50% of the outer radius.

33. A cutting tool having a shaft with a longitudinal axis, wherein the shaft has a forward end and has an external surface, wherein the external surface, when viewed in a cross-section perpendicular to the longitudinal axis and spaced from the forward end, is comprised of:
  a) a flute extending about the longitudinal axis of the shaft along a helix angle, wherein the flute is comprised of a lip extending inwardly from an outer radius and a nose adjacent to the lip;
  b) a land adjacent to the flute and extending about the longitudinal axis of the shaft along the helix angle, wherein the land has a margin which is adjacent to the lip and has a radius equal to the outer radius, and wherein the land also has a clearance portion which is adjacent to the margin and is within an envelope circumscribed by the outer radius;
  c) a convex heel connecting the nose with an adjacent clearance portion to provide a continuous surface between the nose and clearance portion, wherein the heel has a radius of between 15–75% of the outer radius;
  d) wherein the smallest width of the tool about the longitudinal axis is the web thickness and is less than the peripheral distance along any clearance portion; and
  e) wherein the tangent at the point of intersection between each clearance portion and each heel is equal.

34. A cutting tool having a shaft with a longitudinal axis, wherein the shaft has a forward end and has an external surface, wherein the external surface, when viewed in a cross-section perpendicular to the longitudinal axis and spaced from the forward end, is comprised of:
  a) a flute extending about the longitudinal axis of the shaft along a helix angle, wherein the flute is comprised of a lip extending inwardly from an outer radius and a nose adjacent to the lip;
  b) a land adjacent to the flute and extending about the longitudinal axis of the shaft along the helix angle, wherein the land has a margin which is adjacent to the lip and has a radius equal to the outer radius, and wherein the land also has a clearance portion which is adjacent to the margin and is within an envelope circumscribed by the outer radius;
  c) a convex heel connecting the nose with an adjacent clearance portion to provide a continuous surface between the nose and clearance portion, wherein the heel has a radius of between 15–75% of the outer radius;
  d) wherein the smallest width of the tool about the longitudinal axis is the web thickness and is less than the peripheral distance along any clearance portion; and
  e) wherein the tangent at the point of intersection between each clearance portion and each heel and at the point of intersection between each heel and nose is equal.

35. A cutting tool having a shaft with a longitudinal axis, wherein the shaft has a forward end and has an external surface, wherein the external surface, when viewed in a cross-section perpendicular to the longitudinal axis and spaced from the forward end, is comprised of:
  a) a flute extending about the longitudinal axis of the shaft along a helix angle, wherein the flute is comprised of a lip extending inwardly from an outer radius and a nose adjacent to the lip;
  b) a land adjacent to the flute and extending about the longitudinal axis of the shaft along the helix angle, wherein the land has a margin which is adjacent to the lip and has a radius equal to the outer radius, and wherein the land also has a clearance portion which is adjacent to the margin and is within an envelope circumscribed by the outer radius;
  c) a convex heel connecting the nose with an adjacent clearance portion to provide a continuous surface between the nose and clearance portion, wherein the heel has a radius of between 15–75% of the outer radius;
  d) wherein the smallest width of the tool about the longitudinal axis is the web thickness and is less than the peripheral distance along any clearance portion; and
  e) wherein the cutting tool is one of an endmill or a hob.

* * * * *